(12) United States Patent
Abid et al.

(10) Patent No.: US 12,323,003 B2
(45) Date of Patent: **\*Jun. 3, 2025**

(54) STATOR FOR A ROTATING ELECTRICAL MACHINE

(71) Applicant: NIDEC PSA EMOTORS, Carrieres sous Poissy (FR)

(72) Inventors: Fatma Abid, Noisy le Grand (FR); Moustafa Al Eit, Asnieres sur Seine (FR); Sara Bazhar, Bois d'Arcy (FR); Lamya Belhaj, Courbevoie (FR); Xavier Jannot, Angouleme (FR); Jacques Saint-Michel, Angouleme (FR)

(73) Assignee: Nidec PSA Emotors, Carrieres Sous Poissy (FR)

( * ) Notice: Subject to any disclaimer, the term of this patent is extended or adjusted under 35 U.S.C. 154(b) by 557 days.

This patent is subject to a terminal disclaimer.

(21) Appl. No.: 17/434,601

(22) PCT Filed: Feb. 27, 2020

(86) PCT No.: PCT/FR2020/050382
§ 371 (c)(1),
(2) Date: Aug. 27, 2021

(87) PCT Pub. No.: WO2020/174190
PCT Pub. Date: Sep. 3, 2020

(65) Prior Publication Data
US 2022/0149677 A1    May 12, 2022

(30) Foreign Application Priority Data
Feb. 28, 2019 (FR) ...................................... 1902069

(51) Int. Cl.
*H02K 1/16* (2006.01)
*H02K 3/18* (2006.01)
(Continued)

(52) U.S. Cl.
CPC ............... *H02K 1/165* (2013.01); *H02K 3/18* (2013.01); *H02K 3/28* (2013.01); *H02K 15/021* (2025.01); *H02K 29/03* (2013.01); *H02K 2213/03* (2013.01)

(58) Field of Classification Search
CPC ............ H02K 1/165; H02K 3/18; H02K 3/28; H02K 15/024; H02K 29/03; H02K 2213/03
See application file for complete search history.

(56) References Cited

U.S. PATENT DOCUMENTS 7,348,705 B2    3/2008  Cai et al.
2003/0201687 A1*  10/2003  Asai ....................... H02K 3/493
                                                              310/216.069
(Continued)

FOREIGN PATENT DOCUMENTS

CN         205583868 U      9/2016
FR          3019947 A1     10/2015
(Continued)

OTHER PUBLICATIONS

International Search Report for PCT/FR2020/050382 mailed Jun. 5, 2020.
Written Opinion for PCT/FR2020/050382 mailed Jun. 5, 2020.

*Primary Examiner* — Thomas Truong
(74) *Attorney, Agent, or Firm* — Sandberg Phoenix & von Gontard P.C.

(57) ABSTRACT

A stator for a rotating electrical machine comprises a stator mass comprising teeth and notches between the teeth, each of the notches being, on the air gap side, completely closed, electrical conductors being housed in the notches, the electrical conductors forming a fractional winding, for which the ratio q defined by q=Ne/(2pm) is written as an irreducible fraction z/n, z and n being two non-zero integers, n being different from 1, wherein Ne is the number of stator notches, (Continued)

m the number of winding phases and p the number of pairs of stator poles.

16 Claims, 5 Drawing Sheets

(51) Int. Cl.
    *H02K 3/28*           (2006.01)
    *H02K 15/021*        (2025.01)
    *H02K 29/03*         (2006.01)

(56) References Cited

U.S. PATENT DOCUMENTS

| | | |
|---|---|---|
| 2003/0214196 A1 | 11/2003 | Cai et al. |
| 2007/0018525 A1* | 1/2007 | Cai .................. B60L 50/16 310/201 |
| 2010/0001609 A1 | 1/2010 | Ishigami et al. |
| 2014/0319953 A1 | 10/2014 | Rahman et al. |
| 2015/0028713 A1* | 1/2015 | Rahman ............... H02K 3/28 310/198 |
| 2017/0353083 A1 | 12/2017 | Shrestha et al. |
| 2018/0254673 A1* | 9/2018 | Koizumi .............. H02K 3/48 |
| 2019/0157933 A1* | 5/2019 | Al-Ani ................ H02K 1/02 |
| 2019/0363601 A1* | 11/2019 | Kneidl ............... H02K 15/064 |

FOREIGN PATENT DOCUMENTS

| | | | |
|---|---|---|---|
| WO | 98034325 A1 | 8/1998 | |
| WO | WO-2013124239 A2 * | 8/2013 | ........ H02K 1/2753 |

* cited by examiner

STATOR FOR A ROTATING ELECTRICAL MACHINE

CROSS-REFERENCE TO RELATED APPLICATIONS

This application is the US National Stage under 35 USC § 371 of International Application No. PCT/FR2020/050382, filed 27 Feb. 2020 which claims the priority of French application 1902069 filed on Feb. 28, 2019, the content of which (text, drawings and claims) is incorporated here by reference.

BACKGROUND

The present invention relates to rotating electrical machines, and more particularly to the stators of such machines.

The invention relates more particularly to synchronous or asynchronous AC machines. It relates in particular to traction or propulsion machines for electric motor vehicles (Battery Electric Vehicle) and/or hybrid motor vehicles (Hybrid Electric Vehicle—Plug-in Hybrid Electric Vehicle), such as individual cars, vans, trucks or buses. The invention also applies to rotating electrical machines for industrial and/or energy production applications, in particular naval or wind power applications.

PRIOR ART

Electrical machines used in automotive applications most often have a number of notches per pole and per whole phase, and open or semi-open stator notches.

In US 2003/0214196, US 2007/0018525, and U.S. Pat. No. 7,348,705, the notches are semi-open and house U-shaped electrical conductors, the electrical conductors being distributed between two sets of independent coils on four layers, two layers per set of coils. The conductors of two different sets of coils are not electrically connected together in the stator. The connections between the phases are made outside the stator, in a terminal box. In US 2007/0018525, the stator has a number of notches per pole and per fractional phase.

In CN205583868, the stator has a number of notches per pole and per fractional phase, with notches which are entirely closed on the side of the air gap, and closed on the side opposite the air gap by an attached yoke. However, the stator has a concentrated winding, being wound on a tooth.

In patent application US 2014/0319953, the notches of the stator are not closed.

Moreover, in known stators, the stator yoke has fully open or semi-open notches in the direction of the air gap, so as to allow the introduction of the conductors of the windings. Generally, the semi-open notches receive electrical conductors of circular cross-section arranged in bulk, while the fully open notches house electrical conductors of rectangular cross-section, arranged in a row.

Stators are also known in which the notches are closed by non-magnetic or semi-magnetic shims. However, such shims may come off and interfere with the operation of the machine.

US 2010/0001609 relates to a stator in which the notches are closed, and receive U-shaped electrical conductors of rectangular cross-section, which are each connected to a conductor of the adjacent notch, in order to form a series wave winding. The winding is not fractional.

Patent application FR 3,019,947 describes a stator comprising a toothed ring comprising teeth interconnected by material bridges and defining notches therebetween for receiving coils, the notches being open radially outwardly. The notch openings are closed by a yoke attached to the toothed ring.

There is a need to benefit from a stator for a rotating electrical machine that is easy to assemble allowing efficient filling of the notches, while ensuring satisfactory electromagnetic performance. There is also a need to further improve the stators of electrical machines, and in particular to reduce torque ripples, electromagnetic vibrations and noise.

SUMMARY

Stator

The noted need is met and achieved, owing to the disclosed stator for a rotating electrical machine according to one of its aspects, the stator comprising a stator mass comprising teeth and notches between the teeth, each of the notches being, on the air gap side, at least partially closed, in particular completely closed, electrical conductors being housed in the notches, the electrical conductors forming a winding, in particular a single fractional winding, for which the ratio q defined by $q=Ne/(2pm)$ is written as an irreducible fraction $z/n$, z and n being two non-zero integers, n being different from 1, where Ne is the number of stator notches, m is the number of winding phases and p is the number of pairs of stator poles. At least some of the electrical conductors, if not a majority of the electrical conductors, can be in the form of pins, in particular U or I pins.

The noted need is met and achieved, independently of or in combination with the above, by the provision of a stator for a rotating electrical machine, comprising a stator mass comprising teeth and notches between the teeth, each of the notches being, on the air gap side, completely closed, electrical conductors being housed in the notches, the electrical conductors forming a fractional winding, for which the ratio q defined by $q=Ne/(2pm)$ is written as an irreducible fraction $z/n$, z and n being two non-zero integers, n being different from 1, where Ne is the number of stator notches, m is the number of winding phases and p is the number of pairs of stator poles. The stator may have one or more of the features mentioned above or below. In particular, at least some of the electrical conductors, if not a majority of the electrical conductors, can be in the form of pins, in particular U or I pins, and extend axially into the notches.

In another aspect, independently of or in combination with the above, the stator for a rotating electrical machine comprises a stator mass comprising teeth and notches between the teeth, each of the notches being, on the air gap side, at least partially closed, electrical conductors being housed in the notches and being distributed in at least two layers, in particular in only two layers, the electrical conductors forming a single fractional winding, for which the ratio q defined by $q=Ne/(2pm)$ is written as an irreducible fraction $z/n$, z and n being two non-zero integers, n being different from 1, where Ne is the number of stator notches, m is the number of winding phases and p is the number of pairs of stator poles. The stator may have one or more of the features mentioned above or below. In particular, at least some of the electrical conductors, if not a majority of the electrical conductors, can be in the form of pins, in particular U or I pins, and extend axially into the notches.

Fractional Winding

A winding is made up of a number of phases m offset in space in such a way that when supplied by a multi-phase current system, they produce a rotating field.

The electrical conductors can form a single winding. "Single winding" means that the electrical conductors are electrically connected together in the stator, and that the connections between the phases are made in the stator, and not outside the stator, for example in a terminal box.

The electrical conductors can form a distributed winding. The winding is not concentrated or wound on a tooth.

The winding is fractional in the disclosed stator. The winding can be fractional.

For a fractional winding, the number of notches per pole and per phase is fractional, i.e. the ratio q defined by $q=Ne/(2pm)$ is written as an irreducible fraction z/n, z and n being two non-zero integers, n being different from 1, where Ne is the number of notches of the stator, m the number of phases of the winding and p the number of pairs of stator poles.

In one embodiment, q may be strictly greater than 1.5, in particular different from 1.5, better still greater than or equal to 2.25, for example notably equal to 5/2 or 7/2. It is thus possible to reduce the torque harmonics.

The number of notches in the stator can be between 18 and 96, better still between 30 and 84, being for example 18, 24, 27, 30, 36, 42, 45, 48, 54, 60, 63, 72, 81, 92, 96, or even more preferably being 60 or 63. The number of poles of the stator can be between 2 and 24, or even between 4 and 12, for example 6 or 8.

The combination of the number of notches/the number of stator poles can be chosen from the combinations of the following list, which is not exhaustive: 30/4, 42/4, 45/6, 63/6, 60/8, 84/8.

In one embodiment, the combination of the number of notches/the number of stator poles is 60/8. In this case we have $q=60/(2*4*3)=5/2$.

In one embodiment, the combination of the number of notches/the number of pairs of stator poles is 63/6. In this case we have $q=63/(2*3*3)=7/2$.

More broadly, the combination between the number of notches Ne and the number of pairs of stator poles p may be one of those checked in Tables 1(a) and 1(b) below, for a three-phase winding.

A higher number of notches per pole and per phase allows better filtering of harmonics.

TABLE 1a

| Nsp | 3 | 6 | 9 | 12 | 15 | 18 | 21 | 24 |
|---|---|---|---|---|---|---|---|---|
| 1 | X | — | X | — | X | — | X | — |
| 2 | — | X | X | — | X | X | X | — |
| 3 | — | — | X | — | — | — | — | — |
| 4 | — | — | X | X | X | X | X | — |
| 5 | — | — | — | X | X | X | X | X |
| 6 | — | — | — | — | — | X | — | — |
| 7 | — | — | — | — | X | X | X | X |
| 8 | — | — | — | — | — | X | X | X |
| 9 | — | — | — | — | — | — | — | — |
| 10 | — | — | — | — | — | — | X | X |
| 11 | — | — | — | — | — | — | — | X |

| Nsp | 27 | 30 | 33 | 36 | 39 | 42 | 45 |
|---|---|---|---|---|---|---|---|
| 1 | X | — | X | — | X | — | X |
| 2 | X | X | X | — | X | X | X |
| 3 | X | — | — | — | — | — | X |
| 4 | X | X | X | X | X | X | X |
| 5 | X | — | X | X | X | X | X |
| 6 | X | — | — | — | — | — | X |
| 7 | X | X | X | X | X | — | X |
| 8 | X | X | X | X | X | X | X |
| 9 | X | — | — | — | — | — | — |
| 10 | X | X | X | X | X | X | X |
| 11 | X | X | X | X | X | X | X |

TABLE 1b

| Nsp | 48 | 51 | 54 | 57 | 60 | 63 | 66 |
|---|---|---|---|---|---|---|---|
| 1 | — | X | — | X | — | X | — |
| 2 | — | X | X | X | — | X | X |
| 3 | — | — | — | — | — | X | — |
| 4 | — | X | X | X | X | X | X |
| 5 | X | X | X | X | — | X | X |
| 6 | — | — | X | — | — | X | — |
| 7 | X | X | X | X | X | X | X |
| 8 | — | X | X | X | X | X | X |
| 9 | — | — | — | X | — | — | — |
| 10 | X | X | X | X | — | X | X |
| 11 | X | X | X | X | X | X | — |

| Nsp | 69 | 72 | 75 | 78 | 81 | 84 | 87 | 90 |
|---|---|---|---|---|---|---|---|---|
| 1 | X | — | X | — | X | — | X | — |
| 2 | X | — | X | X | X | — | X | X |
| 3 | — | — | — | — | X | — | — | — |
| 4 | X | — | X | X | X | X | X | X |
| 5 | X | X | X | X | X | X | X | — |
| 6 | — | — | — | — | X | — | — | X |
| 7 | X | X | X | X | X | — | X | X |
| 8 | X | X | X | X | X | X | X | X |
| 9 | — | — | — | — | X | — | — | — |
| 10 | X | X | X | X | X | X | X | X |
| 11 | X | X | X | X | X | X | X | X |

Tables 1(a) and 1(b):
Combinations of the Number of Notches Ne and the Number of Pairs of Stator Poles p The number of phases is three in this case, but the number of phases can be different, two for example, the machine then comprising a two-phase winding, or for example 5, 6 or 9. Preferably, the winding is polyphase.

We will now explain the advantages of a fractional winding, possibly associated with closed notches.

The torque ripples and the magnetic forces which depend on the spectrum of the induction in the air gap are the main sources of noise of electromagnetic origin. This noise is manifested on the one hand by the torque ripples which interact with the transmission system and on the other hand by the magnetic forces which apply to the stator of the machine, which can, depending on their amplitudes and their frequencies, excite the eigen modes of the machine and thus make it enter into resonance.

TABLE 2

Harmonic ratio in p.u between a whole and fractional number q

| Machine | Harmonic rate (p.u) |
|---|---|
| q whole without shortening | 1 |
| q whole with shortening | 0.76 |
| q fractional | 0.15 |

Table 3 below shows a comparison of the torque ripples in % between 48 slot, 8 pole machines with a number of notches per pole and per whole phase with a straight rotor and a twisted rotor and 72 notch, 6 pole machines with a number of notches per pole and per whole phase with a straight rotor and a twisted rotor on the one hand, and on the other hand a 63 notch, 6 pole machine with a number of notches per pole and per fractional phase with a straight rotor. The relevance of a fractional winding is understood in reducing the torque ripple rate without having to twist the rotor.

TABLE 3

Torque ripple in [%]

| Machine | Torque ripple [%] | |
| --- | --- | --- |
|  | 4000 rpm | 11000 rpm |
| Full winding 48/8 + straight rotor | 19.2 | 22.1 |
| Full winding 48/8 + twisted rotor | 5.5 | 9.1 |
| Full winding 72/6 + straight rotor | 14.6 | 15.3 |
| Full winding 72/6 + twisted rotor | 2.4 | 5.2 |
| 63/6 fractional winding + straight rotor | 2.3 | 4.6 |

The electrical conductors can be placed in series in a so-called wave winding or in a so-called overlapping winding.

The term "wave winding" is understood to mean a winding in which the electrical conductors of the same phase and of the same pole are electrically connected to one another so that, for a winding path, the electric current of the phase circulates in the electrical conductors rotating about the axis of rotation of the machine, always in one direction. For a winding path, the electrical conductors of the same phase and the same pole do not overlap when observed perpendicular to the rotation axis of the machine.

The term "overlapping winding" is understood to mean a winding in which the electrical conductors of the same phase and of the same pole are electrically connected to one another so that the electric current of the phase circulates in the electrical conductors rotating about the axis of rotation of the machine alternatingly in one direction, then in the other. For a winding path, the electrical conductors of the same phase and the same pole overlap when observed perpendicular to the rotation axis of the machine.

The winding may comprise a single winding path or several winding paths. The current of the same phase flows by winding path in an "electrical conductor." "Winding path" means all the electrical conductors of the machine which are traversed by the same electric current of the same phase. These electrical conductors can be connected to each other in series or in parallel or in series-parallel. In the case where there is only one channel, the electrical conductors are connected in series. In the case where there are several channels, the electrical conductors of each channel are connected in series, and the channels are connected in parallel.

Electrical Conductors

The current of the same phase of a winding path flows in an "electrical conductor."

In each notch there can be one or more layers. "Layer" refers to the series conductors belonging to the same phase arranged in the same notch. In each layer of a notch, there are the electrical conductors of the same phase. In general, the electrical conductors of a stator can be distributed in one layer or in several layers, for example two, three or four layers. When the electrical conductors are distributed in a single layer, each notch only houses electrical conductors of the same phase.

In the disclosed stator, the electrical conductors can be divided into at least two layers, in particular into only two layers. In this case, one or more notches can house electrical conductors of two different phases. This is always the case for a winding with shortened pitch.

In one embodiment, the winding may not comprise more than two layers. In one embodiment, it is notably devoid of four layers.

At least a first electrical conductor housed in a first notch can be electrically connected to a second electrical conductor housed in a second notch, at the outlet from said notches.

"Electrically connected" means any type of electrical connection, in particular by welding, with different possible welding methods, in particular laser, induction, friction, ultrasound, vibrations or brazing, or by mechanical clamping, in particular by crimping, screwing or riveting for example.

The first and second notches are preferably non-consecutive.

The first and second electrical conductors can be electrically connected to the outlet of the first and second notches, that is to say that the electrical connection is formed on the electrical conductors just after their exit from the two notches, at an axial end of the stator mass. The electrical connection can be made in a plane perpendicular to the axis of rotation of the machine. The plane of the electrical connection can be less than 60 mm away from the stator mass, better still less than 40 mm away, for example 27 mm or 38 mm approximately.

A majority of the electrical conductors housed in a first notch can each be electrically connected to a respective second electrical conductor housed in a second notch, at the outlet of said notches. At least one notch, better still a majority of the notches, or even more than half of the notches, better still more than two-thirds of the notches, or even all of the notches, may comprise first electrical conductors each electrically connected to a respective second electrical conductor housed in a second notch, at the outlet of said notches.

In one embodiment, all the electrical conductors having a free end located at the same circumferential position about the axis of rotation of the machine, regardless of their radial position, are electrically connected together.

The first and second electrical conductors can each comprise an oblique portion. The oblique portions may extend in a circumferential direction about the axis of rotation of the machine. The two oblique portions can be configured to converge toward one another and thus allow the electrical connection to be made.

An electrical conductor can comprise two oblique portions, one at each of its two ends. The two oblique portions of the same electrical conductor can extend in opposite directions. They can be symmetrical with respect to each other.

A majority of the electrical conductors can comprise one or more oblique portions as described above.

The electrical conductors can be arranged in the notches in a distributed manner. "Distributed" means that the outgoing and return electrical conductors are each housed in different and non-consecutive notches. At least one of the electrical conductors can pass successively through two non-consecutive notches.

The electrical conductors can be arranged in a row in the notches. "Row" means that the electrical conductors are not arranged in the notches in bulk, but in an orderly manner. They are stacked in the notches in a non-random manner, for example arranged in one or several rows of aligned electrical conductors, in particular in the radial and/or circumferential direction.

The electrical conductors may have a generally rectangular cross-section, in particular with rounded edges. The circumferential dimension of an electrical conductor can correspond substantially to the width of a notch. Thus, a notch may comprise only a single electrical conductor in its width. The width of the notch is measured in its circumferential dimension about the axis of rotation of the machine.

Electrical conductors can be adjacent to each other by their long sides, otherwise called the flat.

Optimizing the stack can make it possible to place a greater quantity of electrical conductors in the notches, and therefore to obtain a stator of greater power at a constant volume.

Each notch can comprise from 2 to 36 electrical conductors, in particular from 2 to 24, better still from 2 to 12 electrical conductors. Each notch may comprise from two to eight electrical conductors, in particular from two to four electrical conductors, for example two or four electrical conductors. In alternative embodiment, each notch comprises two electrical conductors. In another alternative embodiment, each notch comprises four electrical conductors.

Pins

At least some electrical conductors, if not a majority of the electrical conductors, can be in the form of U or I pins. The pin can be U-shaped (a "U-pin") or straight, being I-shaped (an "I-pin").

The pin and flat electrical conductors increase the filling coefficient of the notch, making the machine more compact. Owing to a high filling coefficient, the thermal exchanges between the electrical conductors and the stator mass are improved, which makes it possible to reduce the temperature of the electrical conductors inside the notches.

Furthermore, the manufacture of the stator can be facilitated by the electrical conductors in pin form. In addition, the winding with pins can be modified easily by changing only the connections between the pins at the coil heads. Finally, since the pins do not need to have open notches, it is possible to have closed notches which make it possible to hold the pins, and it is therefore possible to eliminate the step of inserting stator shims.

There is no need in this case for an attached yoke, which makes it possible to improve the mechanical strength of the stator and its thermal conductivity.

As an alternative, the electrical conductors could comprise round wire. In one embodiment, the stator may comprise a magnetic brace as defined below and electrical conductors in the form of a round wire. These can be inserted into the notches on the air gap side before the brace is fitted.

Some of the electrical conductors, or even a majority of electrical conductors, extend axially in the notches. The electrical conductors can be introduced into the corresponding notches by one or both axial ends of the machine.

An I-shaped electrical conductor has two axial ends each placed at one of the axial ends of the stator. It passes through a single notch, and can be welded at each of its axial ends to two other electrical conductors, at the axial ends of the stator.

A U-shaped electrical conductor has two axial ends both placed at one of the axial ends of the stator. It passes through two different notches, and can be welded at each of its axial ends to two other electrical conductors, at the same axial side of the stator. The bottom of the U is placed on the other axial side of the stator.

An electrical conductor, being in the shape of a U-pin, may comprise a first and a second leg extending axially respectively in first A and second R notches. Reference may also be made to the opening of the electrical conductor. The first A and second R notches are separated by a number Nd of teeth. This is the number of teeth between the outgoing notch and the return notch of the same electrical conductor. The number Nd of teeth can be strictly greater than 5, being for example greater than or equal to 6. It may for example be 6, 7 and/or 8, or 9, 10 and/or 11.

The number Nd of teeth may be the same for all the electrical conductors of the stator in the form of U-shaped pins. For the number Nd of teeth, reference may also be made to the pitch of an electrical conductor. When the latter is the same for all the electrical conductors of the stator which are in the form of a U-shaped pin, it is thus possible to facilitate the manufacture of the U-shaped pins, and the step of positioning them in the stator mass is simplified, in particular their insertion. Advantageously, such a configuration makes it possible to improve the smoothing of the field in the air gap, and to reduce the harmonics of the stator.

Strands

In one embodiment, each electrical conductor may comprise one or more strands (also called "wire"). "Strand" refers to the most basic unit for electrical conduction. A strand can be of round cross-section, which may then be called "wire," or may be flat. The flat strands can be shaped into pins, for example U or I pins. Each strand is coated with an insulating enamel.

The fact that each notch can comprise several conductors and/or several strands makes it possible to minimize losses by induced currents, or Joule AC losses, which vary with the square of the supply frequency, which is particularly advantageous when the operating speed is high. It is thus possible to obtain better efficiency at high speed.

The presence of closed notches can make it possible to obtain a reduction in the leakage fluxes seen by the conductors, which leads to a reduction in eddy current losses in the strands.

In one embodiment, each electrical conductor may comprise one or several pins, each forming a strand, as explained above. In this case, all the strands of the same electrical conductor can be electrically connected to each other at the outlet of the notch. The strands electrically connected to each other are placed in short circuit. The number of strands electrically connected together may be greater than or equal to 2, being for example between 2 and 12, being for example 3, 4, 6 or 8 strands.

Several strands can form the same electrical conductor. The same electric current of the same phase circulates in all the strands of the same electrical conductor. All the strands of the same electrical conductor can be electrically connected to each other, in particular at the outlet of the notch. All the strands of the same electrical conductor can be electrically connected to each other at each of their two axial ends, in particular at the outlet of the notch. They can be electrically connected in parallel.

All the strands of all the electrical conductors having a free end located at the same circumferential position about the axis of rotation of the machine, regardless of their radial position, can be electrically connected to one another.

In one embodiment, each electrical conductor comprises a single strand. In another embodiment, each electrical conductor comprises three strands.

In the case where a notch comprises two electrical conductors, a notch can therefore house two strands, or in a variant six strands, for example, distributed between the two electrical conductors.

In an alternative, a notch comprises four electrical conductors. Each electrical conductor can comprise two strands. The notch then houses eight strands, distributed between the four electrical conductors.

The strands can be positioned in the notch so that their circumferential dimension around the axis of rotation of the machine is greater than their radial dimension. Such a configuration allows a reduction in eddy current losses in the strands.

A strand may have a width of between 1 and 5 mm, for example of the order of 2.5 or 3 mm. The width of a strand is defined as its dimension in the circumferential direction about the axis of rotation of the machine.

A strand may have a height of between 1 and 4 mm, for example of the order of 1.6 or 1.8 mm. The height of a strand is defined as its thickness in the radial dimension.

A ratio of the width of a strand to its height can be between 1 and 2.5, better still between 1.2 and 2, or even more preferably between 1.4 and 1.8, being for example 1.56 or 1.66.

In another embodiment, a strand may have a height of between 2 and 8 mm, for example of the order of 4.75 mm. The height of a strand is defined as its thickness in the radial dimension. A ratio of the width of a strand to its height can be less than 1, for example between 0.9 and 0.2, or even between 0.8 and 0.3, being for example about 0.5 to 0.6.

The electrical conductors can be made of copper or aluminum.

Insulators

The electrical conductors are electrically insulated from the outside by an insulating coating, in particular an enamel. The electrical conductors can be separated from the walls of the notch by an insulator, in particular by at least one insulating sheet. Such a sheet insulator allows better insulation of the electrical conductors with respect to the stator mass. The use of closed notches can make it possible to improve the retention of the insulators around the electrical conductors in the notches.

Partially Closed or Fully Closed Notches

The notches can be at least partially closed. A partially closed notch makes it possible to provide an opening at the air gap, which can be used, for example, to install the electrical conductors for filling the notch. A partially closed notch is in particular formed between two teeth which each comprise pole shoes at their free end, which close the notch at least in part.

In an alternative, the notches can be completely closed. The term "fully closed notch" denotes notches which are not open radially toward the air gap.

The notches can be closed on the air gap side by a magnetic brace. The brace can be attached to the teeth on the side of the air gap. The magnetic brace can preferably have the same magnetic permeability as the stator. It can in particular be made of the same material as the stator mass. It can be generally annular in shape and placed in the air gap. It forms bridges of material between the teeth, which close the notches on the side of the air gap. These material bridges are not in one piece with the teeth defining the notch. This magnetic brace can in particular be in a single piece over the entire circumference of the stator. It can be formed from a stack of rolled sheets.

The magnetic brace may have at least one localized constriction formed by at least one groove. The hoop may in particular comprise at least one groove per material bridge closing a notch, said grooves possibly being arranged in front of each of the notches.

When using a brace, it is then possible to use round wire electrical conductors.

In a variant, the stator does not include an added brace serving to close the notches.

In one embodiment, at least one notch, or even each notch, can be continuously closed on the side of the air gap by a material bridge formed in one piece with the teeth defining the notch. All the notches can be closed on the side of the air gap by material bridges closing the notches. The material bridges may have come in one piece with the teeth defining the notch. The stator mass is then devoid of any cutout between the teeth and the material bridges closing the notches, and the notches are then continuously closed on the side of the air gap by the material bridges coming in one piece with the teeth defining the notch.

In addition, the notches can also be closed on the side opposite the air gap by an attached yoke or in one piece with the teeth. The notches are then not radially outwardly open. The stator mass may have no cutout between the teeth and the yoke.

In one embodiment, each of the notches has a continuously closed contour. "Continuously closed" means that the notches have a continuous closed contour when viewed in cross-section, taken perpendicular to the axis of rotation of the machine. It is possible to go all the way around the notch without encountering a cutout in the stator mass.

The presence of the closed notches makes it possible to improve the performance of the electrical machine in terms of the quality of the magnetic field in the air gap, by minimizing the harmonic content and the eddy current losses in the electrical conductors, and the leakage fluxes in the notches, as well as the fluctuations of the magnetic field in the air gap and heating of the machine. The closed notches make it possible to have a closed cylindrical air gap, to reduce the leakage fluxes in the notches, which makes it possible to reduce the AC losses in the stator winding. The battery life is therefore extended owing to the increased efficiency of the machine due to the reduction in AC losses.

In addition, the presence of these closed notches makes it possible to improve the mechanical rigidity of the stator, by mechanically strengthening the stator and by reducing vibrations. In particular, it is possible to obtain a separation of the resonance frequencies from the deformation mode corresponding to 2p, p being the number of pairs of stator poles. Reducing the vibrations can help make the operation of the machine quieter, which can be particularly advantageous when the stator is intended to be associated with a gearbox system.

Also, closing the notch can reduce the stray capacitance between the stator windings and the rotor, which reduces leakage currents and can avoid having to use drain rings or brushes for the shaft currents.

The stator mass can be produced by stacking magnetic sheets, the notches being formed by cutting the sheets. The stator mass can also be produced by cutting from a mass of sintered or agglomerated magnetic powder. The closing of the notches on the side of the air gap is obtained by material bridges in one piece with the rest of the sheets or of the block forming the stator mass.

The stator does not have any attached magnetic shims for closing the notches. This eliminates the risk of accidental detachment of these shims.

Material Bridges

The stator mass may comprise teeth formed between the notches, which are interconnected on the side of the air gap by material bridges. Thus, each notch is closed on the side of the air gap by a material bridge interconnecting two consecutive teeth of the stator mass. The material bridges each connect two teeth adjacent to their base on the side of the air gap and define the bottom of the notch between these teeth on the side of the air gap.

The material bridges are in one piece with the adjacent teeth.

The two consecutive teeth are connected on the opposite side by a yoke. The yoke can be made in one piece with the teeth. The stator can thus be without a yoke attached to a serrated ring.

As mentioned above, the absence of opening of the notches toward the air gap makes it possible to avoid producing electromagnetic disturbances, in particular an increase in the "magnetic" air gap due to the flux fringes, higher iron losses at the rotor surface for the same reason, or alternatively pulsating torques, as well as radial forces and Joule AC losses. The electromagnetic performance of the machine is improved.

The material bridges can be made so as to be magnetically saturated during machine operation. This limits the passage of the flux from one notch to another without preventing the passage of the flux from the rotor to the stator.

The material bridges are preferably not deformable. This increases the stiffness of the stator and improves the life of the electrical machine.

The smallest width of the material bridges is for example between 0.2 and 0.5 mm. It can be of the order of 0.35 mm, for example.

The width of the material bridge can be of the same order of magnitude as the thickness of the sheet.

For example, the stator mass is in the form of stacked sheet metal, having teeth interconnected at their base on the side of the air gap by material bridges.

The material bridges are in one piece with the teeth.
Grooves

The material bridges can each have at least one localized constriction formed by at least one groove. To obtain saturation, the cross-section of the material bridge which is available for the passage of the flux can be locally reduced, for example by providing a groove.

Preferably, the grooves are open toward the notches.

The bottom of the notches on the side of the material bridge has at least one bearing surface, better still at least two bearing surfaces, oriented transversely, and the bottom of the groove is set back relative to the bearing surface(s). The bearing surface(s) may be oriented obliquely with respect to the radial axis of the corresponding notch or oriented perpendicular to this axis. The groove forms a break in slope with respect to the bearing surface(s). The electrical conductors, preferably of substantially rectangular cross-section, inserted into the corresponding notch preferably bear against the bearing surfaces and are set back relative to the bottom of the groove. Preferably, the electrical conductors are not in contact with the groove. The bearing surface(s) are preferably flat. The bottom of the notch can be flat, except for the groove. This allows good filling of the notches by the electrical conductors in the case of electrical conductors of rectangular cross-section, allowing the coils to rest flat in the bottom of the notches.

The groove in the bottom of the notch preferably forms a clearance between the material bridge and the corresponding electrical conductor.

The material bridge may comprise at least two grooves as described above, for example two grooves per notch.

The groove(s) can be centered with respect to the notch(es), or on the contrary be offset with respect to a plane of symmetry of the notch(es).

Preferably, the groove(s) each have a curved profile in cross-section in a plane perpendicular to the axis of the stator, in particular of substantially semi-circular cross-section. The bottom of the groove may be in the form of a circular arc, or of any other suitable shape, for example semi-elliptical or wavy.

The inner surface of the stator is preferably cylindrical.
Notches

At least one notch, more preferably all the notches, may be generally rectangular in cross-section.

At least one notch, better still all the notches, may comprise radial edges having a rib, in particular each having a rib. The rib can make it possible to improve the retention of the electrical conductors in the notches. In addition, the rib can help minimize AC Joule losses.

The rib may extend parallel to the axis of rotation of the machine.

The rib can be placed in a central part of the radial edges, for example halfway between the bottom of the notch and the material bridge closing it. In a variant, at least one notch, better still all the notches, can comprise radial edges each having several ribs, for example two or three. This can in particular be useful in the case where the notch is intended to receive three, four, six or eight electrical conductors. The notch may comprise a rib between each of the layers of electrical conductors.

In an alternative embodiment, the radial edges are rectilinear, being devoid of ribs.

At least one notch can have opposite radial edges parallel to each other, better still all the notches have radial edges parallel to each other. The width of a notch is preferably substantially constant over its entire height. There is thus a better filling rate of the notches.

In an alternative, the radial edges of the notches are not parallel to each other.

At least one notch, better still all the notches, can have a rectilinear bottom, in the form of an arc of a circle or the like. The bottom of the notch is the bottom of the notch located on the side of the yoke, opposite the material bridge and the air gap.

At least one notch, better still all the notches, can have a ratio of the length of the notch to its width of between 2 and 6, better still between 3 and 4. The width of a notch corresponds to its dimension in the circumferential direction measured about the axis of rotation of the machine, and its length to its dimension in the radial direction.

The stator may comprise a sensor for measuring the temperature of the electrical conductors, the sensor being arranged in the notch, for example a thermocouple. This sensor can be housed at least partly in the groove of the material bridge closing the notch. The sensor is for example housed in a space between the conductor closest to the material bridge and the material bridge.

The notches can be configured to allow the passage of a coolant. Some or all of the notches can accommodate ducts for circulating a coolant, or the coolant can flow directly through the notches. The coolant can flow in the bottom of the notch, and/or toward the material bridge, and/or between the electrical conductors, for example between two layers of electrical conductors. The coolant can be a gas, for example air, or a liquid, for example water or oil.

At least one tooth, better still all the teeth, may be generally trapezoidal in cross-section. At least one tooth, better still all the teeth, may have divergent edges moving away from the axis of rotation of the machine.

The stator mass can be produced by stacking sheets. The teeth are connected to each other by material bridges, and on the opposite side by a yoke. The closed notches can be produced entirely by cutting from the sheets. Each sheet of the stack of sheets can be in one piece.

Each sheet is for example cut from a magnetic steel sheet or a sheet containing magnetic steel, for example steel 0.1 to 1.5 mm thick. The sheets can be coated with an electrically insulating varnish on their opposite faces before they are assembled within the stack. Electrical insulation can also be obtained by heat treatment of the sheets, if necessary.

In an alternative, the stator mass can be made from a compacted or agglomerated magnetic powder.

Machine and Rotor

Also disclosed is a rotating electrical machine, such as a synchronous motor or a synchronous generator, comprising a stator as defined above. The machine can be synchronous or asynchronous. The machine can be a reluctance machine. It can constitute a synchronous motor.

The maximum speed of rotation of the machine can be high, being for example greater than 10,000 rpm, better still greater than 12,000 rpm, being for example of the order of 14,000 rpm to 15,000 rpm, or even 20,000 rpm or 25,000 rpm. The maximum speed of rotation of the machine may be less than 100,000 rpm, or even 60,000 rpm, or even less than 40,000 rpm, better still less than 30,000 rpm.

The rotating electrical machine may comprise a rotor. The rotor can be a permanent magnet rotor, with surface or buried magnets. The rotor can be in flux concentration. It can comprise one or more layers of magnets arranged in an I, a U, or a V. Alternatively, it may be a wound or squirrel cage rotor, or a variable reluctance rotor.

The diameter of the rotor may be less than 400 mm, better still less than 300 mm, and greater than 50 mm, better still greater than 70 mm, for example between 100 and 200 mm.

The rotor may comprise a rotor mass extending along the axis of rotation and arranged around a shaft. The shaft may comprise torque transmission means for driving the rotor mass in rotation.

The rotor may or may not be cantilevered.

The machine can be inserted alone in a housing or inserted in a gearbox housing. In this case, it is inserted in a housing which also houses a gearbox.

Manufacturing Method

Another aspect, independently or in combination with the above, is a method for manufacturing a stator for a rotating electrical machine, in particular a stator as defined above, in which electrical conductors are placed in the notches of a stator mass of the stator by inserting them into the corresponding notches via one or both axial ends of the stator.

The same U-shaped electrical conductor can be placed in two different non-consecutive notches of the stator mass of the stator. In the case where an electrical conductor is U-shaped, it can be soldered to two other electrical conductors on the same side of the machine.

Two I-shaped electrical conductors can be connected together beforehand in two different non-consecutive notches of the stator mass of the stator. In the case where an electrical conductor is I-shaped, it can be soldered to two other electrical conductors on two opposite sides of the machine.

In the stator, it is possible to electrically connect all the electrical conductors together which have a free end located at the same circumferential position about the axis of rotation of the machine, regardless of their radial position.

BRIEF DESCRIPTION OF THE DRAWINGS

The disclosed stator may be better understood on reading the detailed description which follows, of non-limiting embodiments thereof, and on examining the appended drawing, in which.

DETAILED DESCRIPTION

Figure 1:
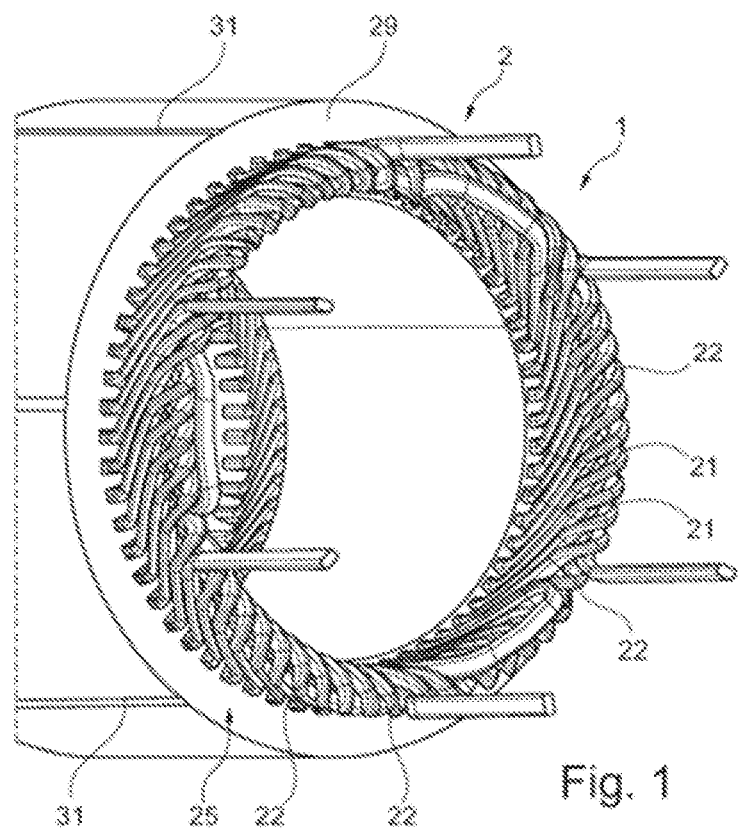
FIG. 1 is a schematic and partial perspective view of a stator.

FIGS. 1 to 5 show a stator 2 of a rotating electrical machine 1 also comprising a rotor, not shown. The stator makes it possible to generate a rotating magnetic field for driving the rotating rotor, in the context of a synchronous motor, and in the case of an alternator, the rotation of the rotor induces an electromotive force in the electrical conductors of the stator.

The examples illustrated below are schematic and the relative dimensions of the various component elements have not necessarily been observed.

The stator 2 comprises electrical conductors 22, which are arranged in notches 21 formed between teeth 23 of a stator mass 25. The notches 21 are closed.

The notches 21 are closed on the side of the air gap by material bridges 27, each connecting two consecutive teeth of the stator mass 25, and on the opposite side by a yoke 29. The yoke 29 and the teeth 23 are in one piece. Where applicable, the yoke 29 can be traversed by longitudinal ribs 31 of semi-circular section intended to house ducts for circulating a coolant.

The electrical conductors 22 are for the most part in the form of pins, namely U or I pins, and which extend axially in the notches. A first electrical conductor housed in a first notch is electrically connected to a second electrical conductor housed in a second notch, at the outlet from said notches.

The first and second notches are non-consecutive. In the illustrated example, they are separated by 7 other notches. Alternatively, the first and second notches are separated by 3, 4, 5, 6, 8, 9, 10 or 11 other notches, for example.

Figure 2:
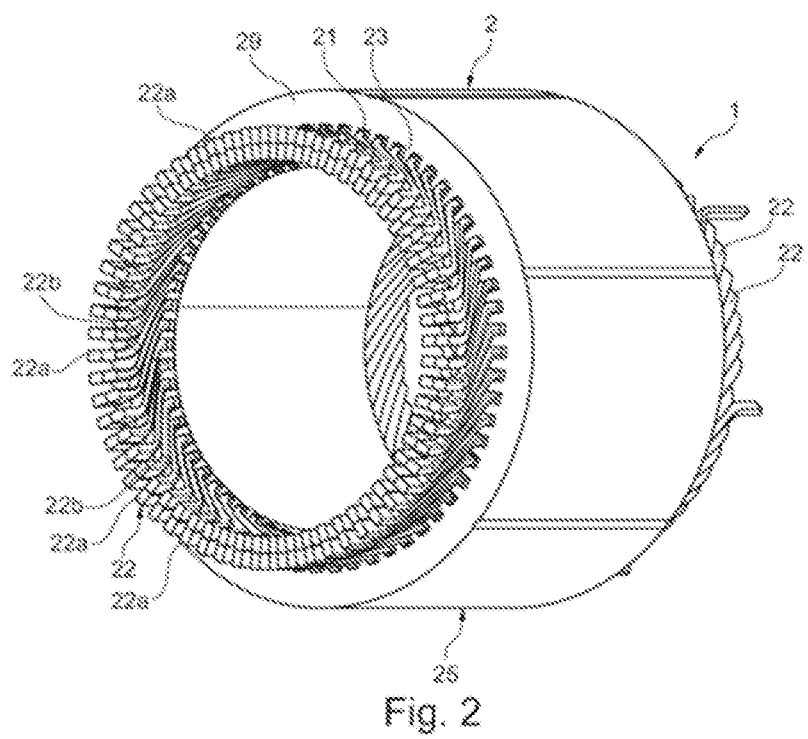
FIG. 2 is a schematic and partial perspective view of the stator of FIG. 1.
Figure 3:
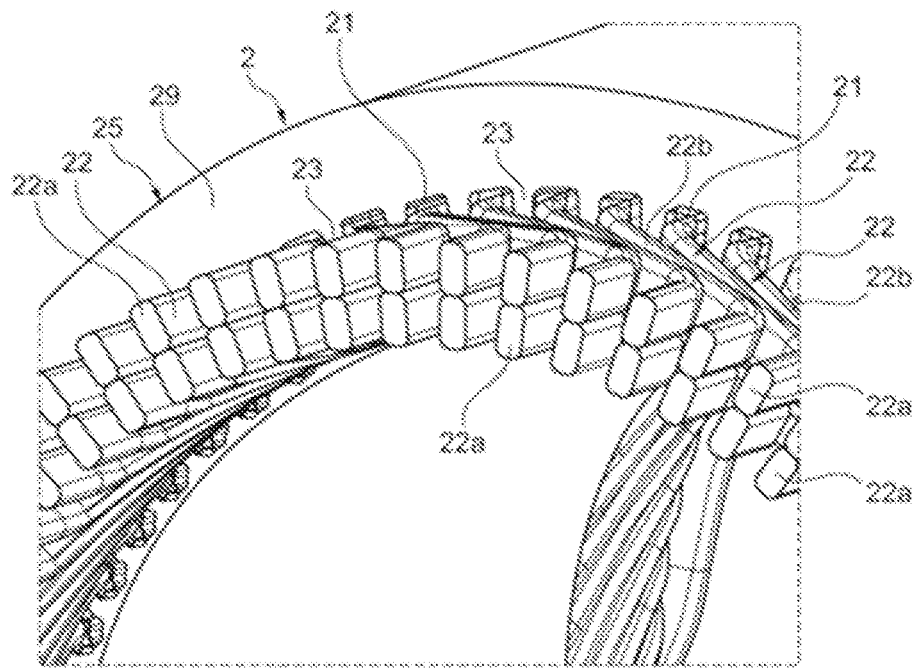
FIG. 3 is a detail perspective view of the stator of FIG. 1.

In particular, FIG. 2 shows the end surfaces 22a of the first and second electrical conductors intended to receive the electrical connection. The electrical connection is made in a plane perpendicular to the axis of rotation of the machine. The plane of the electrical connection can be less than 40 mm away from the stator mass, in particular approximately 27 mm away.

The electrical connection is formed on the electrical conductors just after they exit the two notches, at one axial end of the stator mass. The two conductors each comprise an oblique portion 22b, which converge toward one another.

The electrical conductors are arranged in the notches in a distributed manner, and they form a distributed winding, which is fractional in the described example. In this example, the number of notches is 60. The number of stator poles is 8. Thus, the ratio of the number of notches/the number of stator poles is 60/8.

Figure 4:
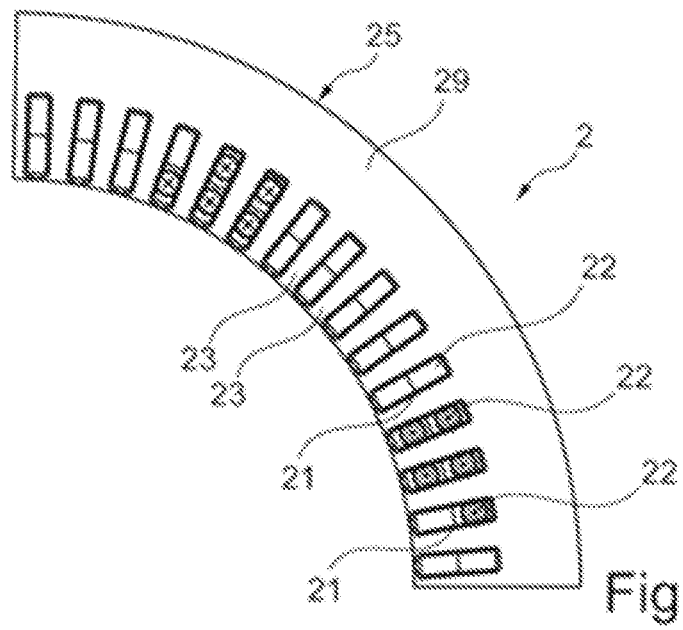
FIG. 4 is a schematic and partial cross-sectional view of the stator.

The electrical conductors form a fractional winding, for which the ratio q, defined by $q=Ne/(2pm)$, is written as an irreducible fraction $z/n$, z and n being two non-zero integers, n being different from 1, where Ne is the number of notches of the stator, m the number of phases of the winding and p the number of pairs of stator poles. In particular, FIG. 4 shows a one-phase coil in isolation in the case of a three-phase fractional winding. We then have $q=60/(3\times8)=5/2$ for this machine with 60 notches and 8 poles. A coil is formed by the outgoing electrical conductors of the same phase passing through adjacent notches, and by the return electrical conductors of the same phase passing through adjacent notches.

The electrical conductors 22 are arranged in a row in the notches 21, in a row of aligned electrical conductors.

The electrical conductors may have a generally rectangular cross-section, in particular with rounded corners. In the described example, they are superimposed radially in a single row. The circumferential dimension of an electrical conductor corresponds substantially to the width of a notch. Thus, the notch comprises only one electrical conductor in its width. It can comprise several electrical conductors in its radial dimension. It comprises two in the described example.

The electrical conductors 22 are made of copper or aluminum, or any other conductive material enameled or coated with any other suitable insulating coating.

Figure 6:
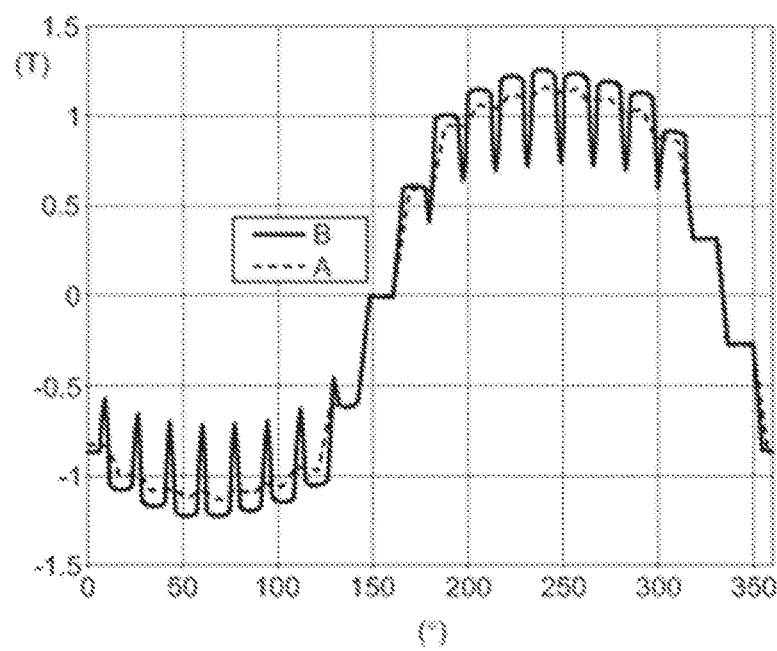
FIG. 6 illustrates the variation of the radial air gap field, in Tesla, as a function of the angular position in degrees)(°.

FIG. 6 illustrates the variation of the radial air gap field due to the armature reaction alone, in Tesla, as a function of the angular position in degrees(°). Curve A illustrates this variation for a stator with closed notches, and is presented in comparison with curve B, which illustrates this variation for a stator with semi-open notches, with an opening of 2 mm. It can be seen that the radial air gap field obtained with a stator with closed notches (curve A) is less rich in harmonics.

In the example which has just been described, a notch comprises two electrical conductors of different phases, and each electrical conductor is formed from a single strand.

Figure 7:
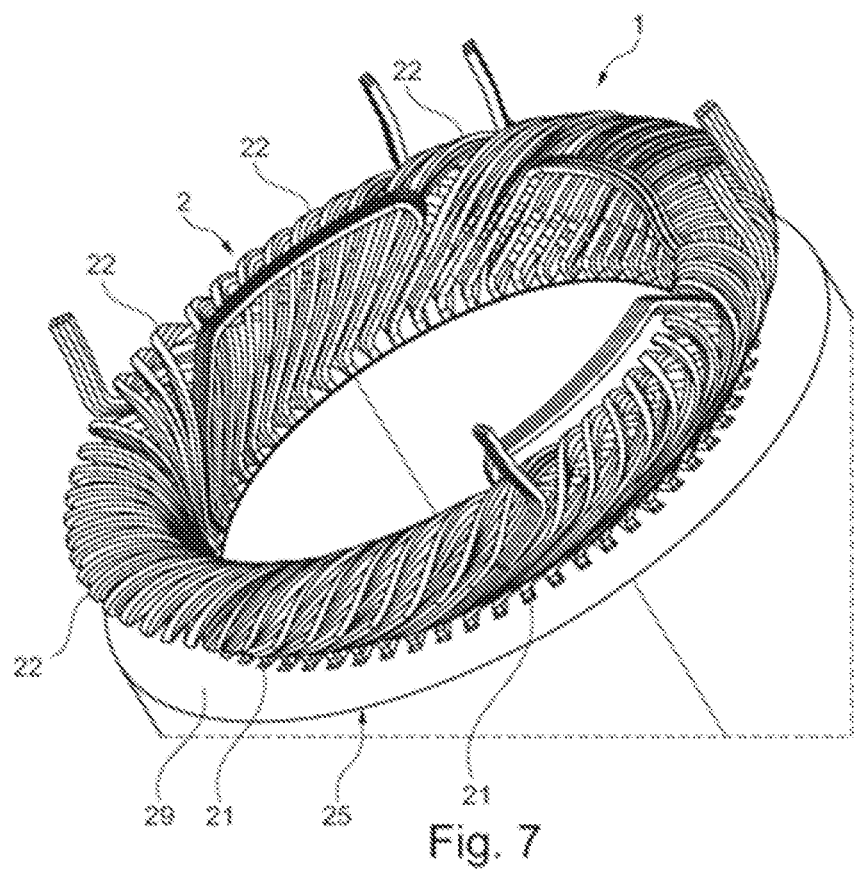
FIG. 7 is a perspective view of an alternative embodiment.
Figure 8:
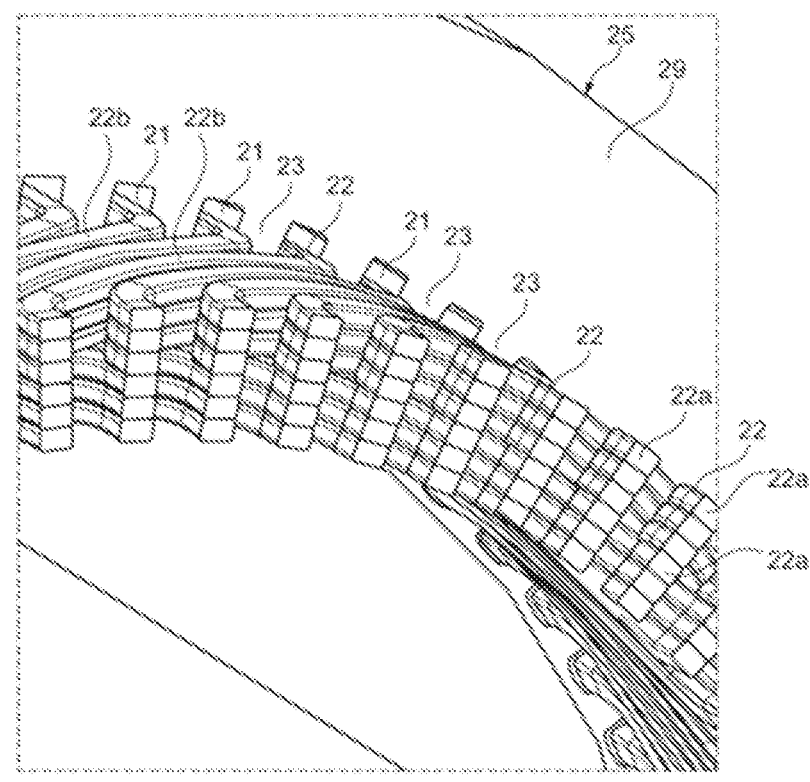
FIG. 8 is a detail perspective view of the stator of FIG. 5.
Figure 9:
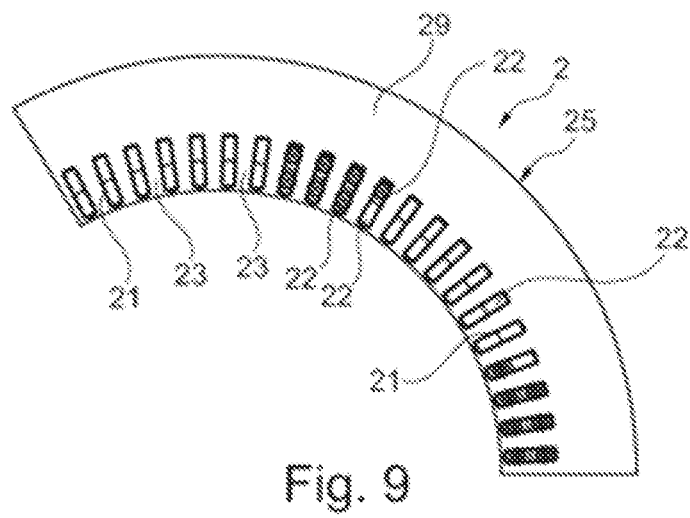
FIG. 9 is a schematic and partial cross-sectional view of the stator of FIG. 7.

In the alternative embodiment of FIGS. 7 to 9, each electrical conductor comprises several pins, each forming a strand 32 within a notch. Thus, each electrical conductor comprises three strands 32. All the strands 32 of the same electrical conductor 22 are electrically connected to each other at the outlet of the notch, and to each of their two axial ends 22a.

Figure 5:
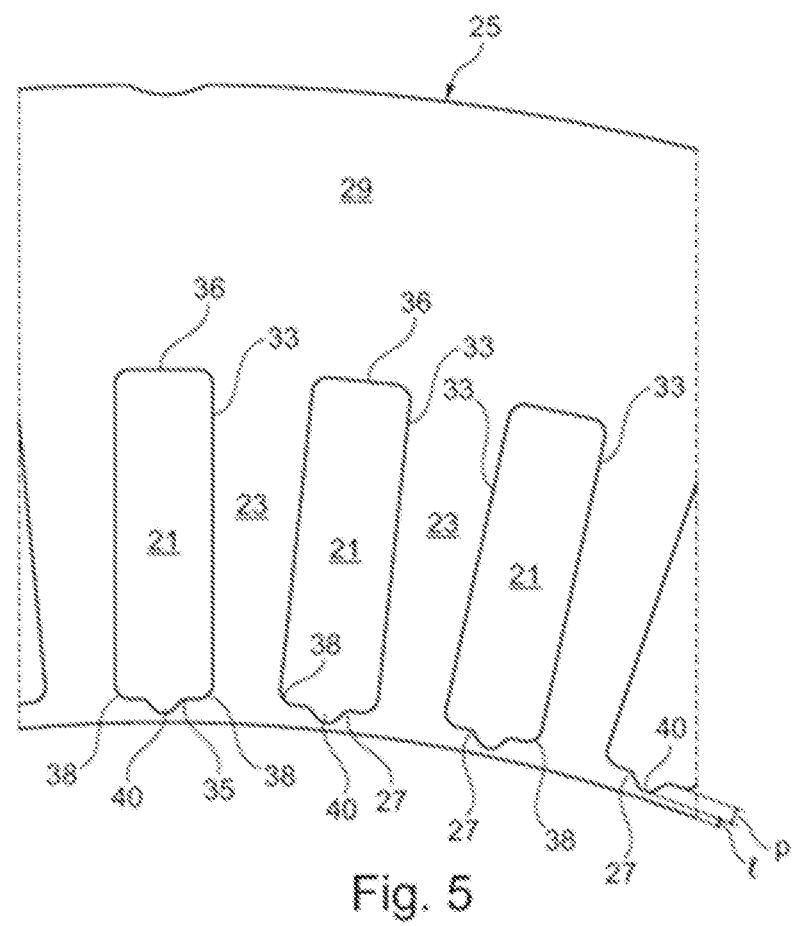
FIG. 5 is a schematic and partial cross-sectional view of the stator mass of the stator.

Furthermore, the stator of FIGS. 5 and 6 comprises 63 notches and 6 poles of the stator. Thus, the ratio of the number of notches/the number of stator poles is 63/6.

Thus, the electrical conductors form a fractional winding, for which the ratio q defined by $q=Ne/(2pm)$ is written as an irreducible fraction $z/n$, z and n being two non-zero integers, n being different from 1, where Ne is the number of notches of the stator, m the number of phases of the winding and p the number of pairs of stator poles. In particular, FIG. 9 shows a one-phase coil in isolation in the case of a three-phase fractional winding. We then have $q=63/(3\times6)=7/2$ for this machine with 63 notches and 6 poles. A coil is formed by the outgoing electrical conductors of the same phase passing through adjacent notches, and by the return electrical conductors of the same phase passing through adjacent notches.

Each electrical conductor 22 is surrounded by an insulating sheet not visible in the figures, making it possible to insulate the electrical conductors of the walls 33 and 36 of the notch and the electrical conductors 22 of different phases from one another within a notch.

In the described examples and as visible in FIG. 5, the notches 21 have radial edges 33 which are parallel to one another, and in cross-section are in a plane perpendicular to the axis of rotation of the machine of substantially rectangular shape.

The bottom 35 of the notches 21 is of a shape substantially complementary to that of the electrical conductors 22, with the exception of a groove 40, as can be seen in FIG. 5.

The bottom 35 of the notches 21 is connected to the radial edges 33 by rounded edges or corners 38. The groove 40 of each notch 21 is centered on the bottom of the notch 35 and extends along the axis of rotation of the machine. In an alternative embodiment, not shown, the groove is not centered, or the bottom 35 comprises several grooves.

The grooves 40 have, in cross-section in a plane perpendicular to the axis of rotation, a rounded shape, in particular substantially semi-circular. They present a depth p between 0.3 mm and 0.6 mm, for example equal to 0.5 mm.

The presence of the grooves 40 leads to a localized constriction of the material bridges 27. Such a constriction allows a magnetic saturation of the sheet for a lower magnetic flux along the bridge 27, which limits the passage of the magnetic flux.

The smallest width I of the material bridges 27 is preferably between 0.2 mm and 0.5 mm, for example equal to 0.35 mm.

Figure 10:
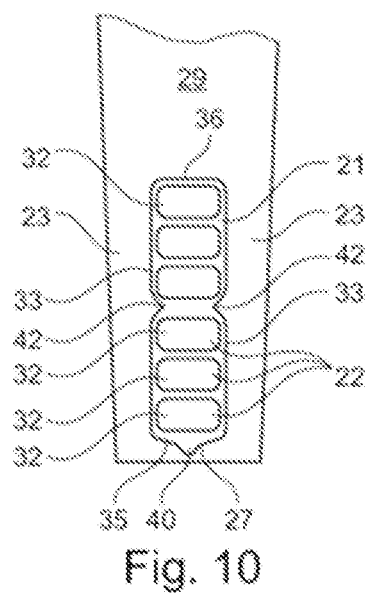
FIG. 10 is a schematic and partial cross-sectional view of an alternative embodiment.

The notches are generally rectangular in cross-section. All or part of the notches may comprise radial edges 33 having a rib 42, as illustrated in FIG. 10. Each rib 42 may extend parallel to the axis of rotation of the machine. This rib 42 is placed in a central part of the radial edges 33, substantially halfway between the bottom of the notch 36 on the side of the yoke 29 and the material bridge 27 closing it.

The stator mass 25 is formed from a bundle of magnetic sheets stacked along the axis of rotation, the sheets for example being identical and exactly superimposed. They can be held together by clipping, gluing, rivets, tie rods, welds and/or any other technique. The magnetic sheets are preferably made of magnetic steel. The teeth 23 of the stator mass 25 may have complementary surface reliefs making it possible to clip the various sheets making up the stator mass 25 together.

The stator can be obtained by means of a manufacturing method in which the electrical conductors 22 are inserted into the notches 21 by one or both axial ends of the stator, by sliding in the notches 21 along an axis of rotation parallel to the longitudinal axis In the stator, all the electrical conductors which have a free end located at the same circumferential position about the axis of rotation of the machine are electrically connected together, regardless of their radial position.

Of course, the claimed invention is not limited to the embodiments which have just been described, and the rotor associated with the described stator can be wound, with a squirrel cage or with permanent magnets, or else with variable reluctance.

The expression "comprising a" should be understood as being synonymous with "comprising at least one."

The invention claimed is:

1. A stator for a rotating electrical machine comprising a stator mass comprising teeth and notches between the teeth, each of the notches being at least partially closed on an air gap side of the stator, electrical conductors housed in the notches and being distributed in at least two layers, the electrical conductors forming a single fractional winding, for which a ratio q defined by q=Ne/(2pm) is written as an irreducible fraction z/n, z and n being two non-zero integers, n being different from 1, where Ne is the number of stator notches, m is the number of winding phases and p is the number of pairs of stator poles, wherein at least some of the electrical conductors are in the form of pins, and wherein the electrical conductors are electrically connected together in the stator, connections between the winding phases being made in the stator.

2. The stator according to claim 1, wherein the electrical conductors form a distributed winding.

3. The stator according to claim 1, wherein a majority of the electrical conductors are in the form of pins extending axially into the notches.

4. The stator according to claim 1, wherein all the notches are continuously closed on the air gap side by a material bridge formed in one piece with the teeth defining the notch.

5. The stator according to claim 1, wherein the material bridges each having at least one localized constriction defined by at least one groove.

6. The stator according to claim 1, wherein the notches are closed on the side opposite the air gap side by a yoke attached to or integral with the teeth.

7. The stator according to claim 1, wherein the electrical conductors have a generally rectangular cross-section.

8. The stator of claim 7 wherein the electrical conductors have rounded corners.

9. The stator according to claim 1, wherein each notch comprises two to eight electrical conductors, each electrical conductor comprising one or more strands.

10. The stator according to claim 1, wherein at least one of said electrical conductors is in the shape of a U-pin comprising a first and a second leg extending axially respectively in a first notch of said notches and a second notch of said notches, the first and second notches being separated by a number Nd of teeth, the number Nd of teeth being strictly greater than 5.

11. The stator according to claim 1, wherein at least one of said notches comprises radial edges having a rib, said rib extending inwardly from said radial edges and being adapted to improve the retention of the electrical conductors in the notches.

12. The stator according to claim 1, wherein at least one of said notches has a rectilinear or arcuate shaped bottom.

13. The stator according to claim 1, wherein the notches are configured to allow the passage of a coolant.

14. A rotating electrical machine comprising a stator according to claim 1 and a rotor.

15. The stator of claim 1 wherein the pins are U-or I-shaped pins.

16. A stator for a rotating electrical machine comprising a stator mass comprising teeth and notches between the teeth, each of the notches being at least partially closed on an air gap side of the stator, electrical conductors housed in the notches and being distributed in at least two layers, the electrical conductors forming a single fractional winding, for which a ratio q defined by q=Ne/(2pm) is written as an irreducible fraction z/n, z and n being two non-zero integers, n being different from 1, where Ne is the number of stator notches, m is the number of winding phases and p is the number of pairs of stator poles, wherein at least some of the electrical conductors are in the form of pins, and wherein the electrical conductors are distributed in only two layers.

\* \* \* \* \*